US006832752B2

United States Patent
Cuzzocrea

(10) Patent No.: US 6,832,752 B2
(45) Date of Patent: Dec. 21, 2004

(54) MODULAR-GRID FENCE SYSTEM

(76) Inventor: Lawrence A. Cuzzocrea, 3502 E. Vineyard Rd., Phoenix, AZ (US) 85040

( * ) Notice: Subject to any disclaimer, the term of this patent is extended or adjusted under 35 U.S.C. 154(b) by 20 days.

(21) Appl. No.: 10/313,413

(22) Filed: Dec. 6, 2002

(65) Prior Publication Data
US 2003/0107031 A1 Jun. 12, 2003

Related U.S. Application Data
(60) Provisional application No. 60/340,587, filed on Dec. 6, 2001.

(51) Int. Cl.$^7$ .............................................. E04H 17/16
(52) U.S. Cl. .............................. 256/25; 256/32; 256/45
(58) Field of Search ............................. 256/24, 25, 32, 256/45

(56) References Cited

U.S. PATENT DOCUMENTS

| 1,182,018 A | * | 5/1916 | Koenig ......................... 256/25 |
| 1,330,404 A | * | 2/1920 | Sommer .................... 256/25 X |
| 2,581,318 A | * | 1/1952 | Bartlett ..................... 256/25 X |
| 2,835,223 A | * | 5/1958 | Erickson ................... 256/26 X |
| 3,423,072 A | * | 1/1969 | Bernstein ...................... 256/24 |
| 3,767,167 A | * | 10/1973 | Rasmussen ............... 256/24 X |
| 4,356,999 A | * | 11/1982 | McShane |
| 4,371,148 A | * | 2/1983 | Harden ...................... 256/25 X |
| 4,852,194 A | * | 8/1989 | Langan ...................... 256/24 X |
| 5,076,545 A | * | 12/1991 | Bodzin ........................... 256/1 |
| 5,533,714 A | * | 7/1996 | St. John .................... 256/24 X |
| 5,533,715 A | * | 7/1996 | Dandrea ....................... 256/45 |
| 5,718,414 A | * | 2/1998 | Deloach et al. ............... 256/24 |
| 5,868,382 A | * | 2/1999 | Groves ....................... 256/24 X |
| 6,578,827 B2 | * | 6/2003 | McCracken ............... 256/24 X |

FOREIGN PATENT DOCUMENTS

| EP | 524860 A1 | * | 1/1993 |
| FR | 2606817 A1 | * | 5/1988 |

* cited by examiner

Primary Examiner—Daniel P. Stodola
Assistant Examiner—Ryan M. Flandro
(74) Attorney, Agent, or Firm—Martin L. Stoneman

(57) ABSTRACT

A modular-grid fence system that comprises integral connectors on each end that allows each respective grid to be connected to each other grid and form a fence. The connectors also provide that the modular-grid fence system may be utilized in angles from near zero degrees, to an in-line angle of 180 degrees. This connecting feature provides that the modular-grid fence system may be used to augment and provide additional restriction to an existing fence, or be used as a freestanding fence. In addition, the modular-grid fence system is stackable, easily assembled without tools, and storable or shippable in a flat container.

20 Claims, 3 Drawing Sheets

MODULAR-GRID FENCE SYSTEM

REFERENCE TO RELATED APPLICATIONS

This application claims benefit of Provisional application No. 60/340,587 filed Dec. 6, 2001.

BACKGROUND

This invention relates to providing a system for fencing. Typically, fences, such as pool fences, have openings of 4 inches or more. Small children and animals may still be able to penetrate such fencing and gain access to the fenced area. Heretofore, people have used chicken wire or chain-link fencing to augment or further block a primary fence structure that comprises such openings. These types of augmented fencing are difficult and time-consuming to install. It would be useful to have a fence system that could act independently or complement another fence, such as described, be easily installed, transported, stored and also provide additional restriction and pleasing appearance.

OBJECTS OF THE INVENTION

A primary object and feature of the present invention is to fulfill the above needs in providing a system for fencing.

It is a further object and feature of the present invention to provide such a fence system that is easily assembled and disassembled.

It is a further object and feature of the present invention to provide such a fence system that may be added to and complements another fence, thereby limiting access even further.

It is a further object and feature of the present invention to provide such a fence system that is stackable, easily stored, and has a pleasing appearance.

A further primary object and feature of the present invention is to provide such a system which is efficient, inexpensive, and handy. Other objects and features of this invention will become apparent with reference to the following descriptions.

SUMMARY OF THE INVENTION

In accordance with a preferred embodiment hereof, this invention provides a modular fence system comprising, in combination: a plurality of substantially-rectangular, integral, modular-grid fence elements, each respective such modular grid fence element having a first length end and a second length end; and, wherein each respective such substantially-rectangular, integral, modular-grid fence element comprises at least one connector structured and arranged to connect at least one of such first length end and such second length end with at least one length end of another of such plurality of substantially-rectangular, integral, modular-grid fence elements. Moreover, it provides such a modular fence system wherein such at least one connector further comprises at least one male connector and at least one female connector structured and arranged such that, when such substantially-rectangular, integral modular grid fence element and such another substantially-rectangular, integral modular grid fence element are connected, there is no substantial gap between such respective elements.

Additionally, it provides such a modular fence system wherein: such at least one male connector comprises at least one cylindrical pin; and, such at least one female connector comprises at least one hollow cylinder; wherein such at least one male connector slidably inserts into such at least one female connector. Also, it provides such a modular fence system wherein such plurality of substantially-rectangular, integral, modular-grid fence elements each comprises a substantially-rectangular, integral, modular wire grid, each such substantially-rectangular, integral, modular wire grid having a plurality of vertical wires and a plurality of horizontal wires connected together in a grid pattern. In addition, it provides such a modular fence system wherein: each such substantially-rectangular, integral, modular wire grid comprises a first length end and a second length end; at least two such male connectors are connected to such first length end; at least two such female connectors are connected to such second length end; and at least two of such plurality of respective such substantially-rectangular, integral, modular-grid fence elements may be connected to each other by inserting each one of such at least two male connectors into a respective one of such at least two female connectors. And, it provides such a fence system wherein such grid pattern comprises vertical and horizontal wires spaced about every 2½ inches, on center, in both directions. Further, it provides such a modular fence system wherein such grid pattern and distances are maintained when such at least one connector is used to connect one of such substantially-rectangular, integral, modular grid fence elements to another of such substantially-rectangular, integral, modular grid fence elements.

Even further, it provides such a modular fence system wherein each such plurality of substantially-rectangular, integral, modular-grid fence elements comprises an exterior dimension of about two feet by about four feet. Moreover, it provides such a fence system wherein each of such plurality of substantially-rectangular, integral, modular-grid fence elements comprises steel. Additionally, it provides such a modular fence system wherein each such plurality of substantially-rectangular, integral, modular-grid fence elements comprises paint. Also, it provides such a modular fence system wherein each such plurality of such substantially-rectangular, integral, modular grid fence elements comprises non-corrosive paint. In addition, it provides such a modular fence system wherein each such plurality of such substantially-rectangular, integral, modular grid fence elements comprises non-corrosive material. And, it provides such a modular fence system wherein such plurality of such substantially-rectangular, integral, modular grid fence elements may be connected to each other respective such plurality of substantially-rectangular, integral, modular grid fence elements to form a self-standing fence.

Further, it provides such a modular fence system wherein each such at least two male connectors comprises a cylindrical pin; and, each such at least two female connectors comprises a hollow cylinder; wherein such grid pattern comprises vertical and horizontal wires spaced about every 2½ inches, on center, in both directions; wherein each such substantially-rectangular, integral, modular wire grid comprises an exterior dimension of about twenty-two and one-half inches by about forty-seven and one-half inches; wherein each such substantially-rectangular, integral, modular wire grid may be connected to each other respective such substantially-rectangular, integral, modular wire grid; and wherein such grid pattern and distances are maintained when each such substantially-rectangular, integral, modular wire grid is connected to each other respective such substantially-rectangular, integral, modular wire grid. Even further, it provides such a modular fence system wherein each such wire grid may be connected to each other respective such wire grid to form a self-standing fence. Even further, it provides such a modular fence system wherein each such plurality of substantially-rectangular, integral, modular-grids comprises non-corrosive paint. Even further, it provides such a modular fence system wherein each such plurality of substantially-rectangular, integral, modular-grids comprises non-corrosive material.

In accordance with another preferred embodiment hereof, this invention provides a method of making a secondary fence system attached to a primary fence system, comprising, in combination: providing a plurality of modular-grid fence elements, each respective such modular grid fence element having a first length end and a second length end, wherein each respective such modular-grid fence element comprises at least one connector structured and arranged to connect at least one of such first length end and such second length end with at least one length end of another of such plurality of modular-grid fence elements; using such at least one connector, connecting such plurality of modular-grid fence elements; attaching such plurality of modular-grid fence elements to the primary fence system.

In accordance with another preferred embodiment hereof, this invention provides a modular system for dividing spaces comprising, in combination: a plurality of substantially-rectangular, integral, modular-grid elements, each respective such modular grid element having a first length end and a second length end; wherein each respective such modular-grid element comprises at least one connector structured and arranged to connect at least one of such first length end and such second length end with at least one length end of another of such plurality of modular-grid elements.

In accordance with another preferred embodiment hereof, this invention provides a secondary fence system for attachment to a primary fencing, comprising, in combination: a plurality of modular-grid fence elements, each respective such modular grid fence element having a first length end and a second length end; wherein each respective such modular-grid fence element comprises at least one connector structured and arranged to connect at least one of such first length end and such second length end with at least one length end of another of such plurality of modular-grid fence elements; and, at least one attacher structured and arranged to attach such plurality of grid fence elements to the primary fencing. Even further, it provides such a secondary fence system wherein such plurality of modular-grid fence elements is color-matched to such primary fencing. Even further, it provides such a modular fence system wherein such plurality of modular-grid fence elements is attached to such primary fencing.

DETAILED DESCRIPTION OF A PREFERRED EMBODIMENT OF THE INVENTION

Figure 1:
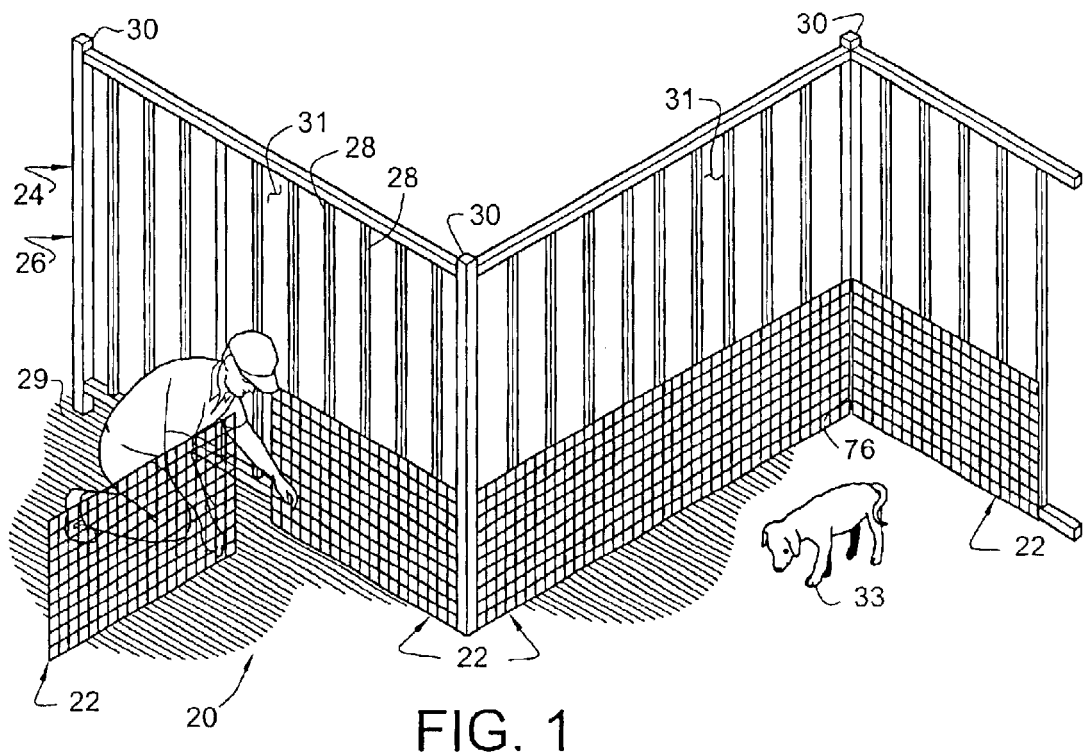
FIG. 1 is a perspective view of the modular-grid fence system according to a preferred embodiment of the present invention.

Reference is now made to the drawings. FIG. 1 is a perspective view of the modular-grid fence system 20 according to a preferred embodiment of the present invention. Preferably, modular-grid fence system 20 comprises at least one, and preferably a plurality of, modular-grid fence panel(s) 22. Preferably, each respective plurality, of modular-grid fence panel(s) 22 comprises a substantially-rectangular, integral, modular-grid, as shown (embodying herein a plurality of substantially-rectangular, integral, modular-grid fence elements, each respective such modular grid fence element having a first length end and a second length end; and, embodying herein a plurality of modular-grid fence elements, each respective such modular grid fence element having a first length end and a second length end). In a preferred embodiment, modular-grid fence panel(s) 22 are preferably assembled and installed adjacent a primary fence 26, which is preferably a stationary permanent fence 24, such as primary fence 26, as shown (embodying herein wherein such plurality of modular-grid fence elements is attached to such primary fencing). Preferably, the parts of the fence system 20 are made of steel (embodying herein wherein each of such plurality of substantially-rectangular, integral, modular-grid fence elements comprises steel) and, preferably, the parts are color-matched to the primary fence 26 (embodying herein wherein such plurality of modular-grid fence elements is color-matched to such primary fencing). For example, such color-matching may be done with paint (embodying herein wherein each such plurality of substantially-rectangular, integral, modular-grid fence elements comprises paint) or a color-coating. Under appropriate circumstances, other material and color arrangements may suffice. For example, a non-corrosive material such as high strength plastic, aluminum or stainless steel may suffice (embodying herein wherein each such plurality of substantially-rectangular, integral, modular-grids comprises non-corrosive material). Furthermore, use of a non-corrosive coating may also be utilized (embodying herein wherein each such plurality of substantially-rectangular, integral, modular-grids comprises non-corrosive paint). Even further, in light of the teachings herein those knowledgeable in such materials art may select less costly materials especially where such material use provides the required fencing functions of the user. Still further, such materials may be decorative. Such primary fence(s) 26 typically have standardized spacing 31 between the bars 28 of the fencing structure, as shown (for example, a pool fence having vertical bar(s) 28 located at about five inches on center). Further, such primary fence(s) 26 typically comprise post members 30, which are usually set in the ground 29 (or other such substrate) and support the primary fence 26.

Preferably, fence panel(s) 22 are rectangular having dimensions of about two feet in height by about four feet in length (embodying herein wherein each such plurality of substantially-rectangular, integral, modular-grid fence elements comprises an exterior dimension of about two feet by about four feet). Most preferably, having preferred dimensions of forty-seven and one half inches in length and about twenty-two and one half inches in height (embodying herein wherein each such substantially-rectangular, integral, modular wire grid comprises an exterior dimension of about twenty-two and one-half inches by about forty-seven and one-half inches). Under appropriate circumstances, other dimensional arrangements may suffice, for example, to match alternate primary fence sizes. Preferably, the fence panel(s) 22 is/are sized in length such that the fence panel(s) 22 may be installed between the post members 30, either singularly or in multiple pieces, as shown. Typically, primary fence(s) 26 used around pools are about eight feet between post members 30. Under appropriate circumstances, the fence panel(s) 22 may be interconnected and installed continuously over the post members 30. As illustrated in FIG. 1, the fence system 20 assists in improving the fence by further restricting the openings 31 between the bars 28, for example, by restricting an animal 33 from passing through the fence. Further specific details of the fence system 20 will now be explained below.

Figure 2:
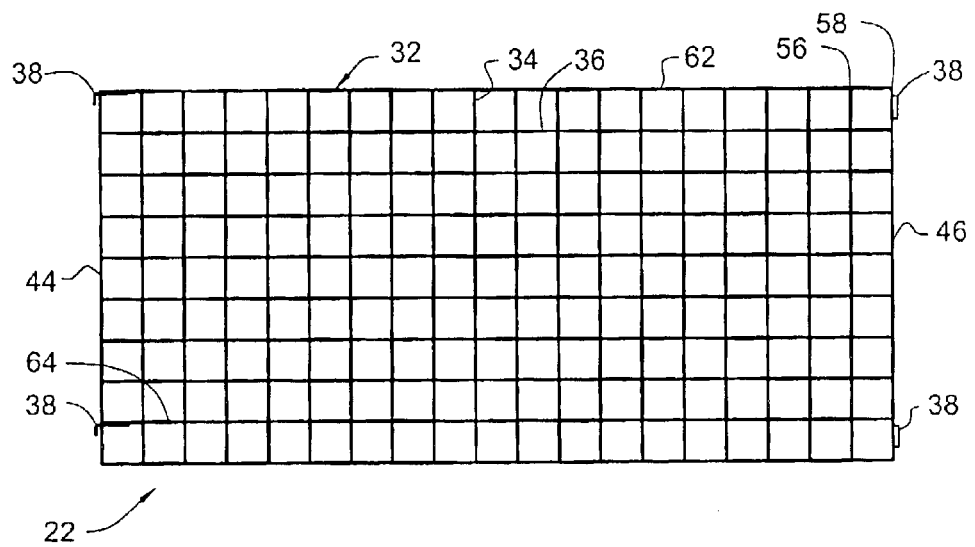
FIG. 2 is a front view of a fence panel of the modular-grid fence system according to a preferred embodiment of the present invention.

FIG. 2 is a front view of a fence panel 22 of the fence system 20 according to a preferred embodiment of the present invention. Preferably, fence panel(s) 22 comprise a modular grid 32, as shown, preferably made from rounded steel wire, preferably comprising a wire of about 7-gauge (about three-sixteenths of an inch in diameter). Preferably, grid 32 comprises a plurality of equally spaced parallel vertical wire member(s) 34 and a plurality of equally spaced parallel horizontal wire members 36, as shown (embodying herein wherein such plurality of substantially-rectangular, integral, modular-grid fence elements each comprises a substantially-rectangular, integral, modular wire grid, each such substantially-rectangular, integral, modular wire grid having a plurality of vertical wires and a plurality of horizontal wires connected together in a grid pattern).

Preferably, the vertical wire member(s) 34 and horizontal wire members 36 are overlaid and spot welded together at the points of crossing, using known spot-welding methods, to form a grid 32 with about two-and-one-half-inch spacing, center-to-center of the wire, between each respective vertical wire member 34 and each respective horizontal wire member 36, with the exception of the second end 46 (this arrangement embodies herein wherein such grid pattern comprises vertical and horizontal wires spaced about every 2½ inches, on center, in both directions).

Preferably, at second end 46, the last vertical end wire 58 is moved toward the second to the last vertical wire 56 about three-sixteenths of an inch, such that a distance D (see FIG. 4) of about five-inch spacing, center-to-center of the vertical wires, is maintained, when two fence panel(s) 22 are connected end-to-end, as shown and further described in the following Figures. This arrangement embodies herein wherein such grid pattern and distances are maintained when such at least one connector is used to connect one of such substantially-rectangular, integral, modular grid fence elements to another of such substantially-rectangular, integral, modular grid fence elements; and, embodies herein wherein each such substantially-rectangular, integral, modular wire grid may be connected to each other respective such substantially-rectangular, integral, modular wire grid.

Figure 3:
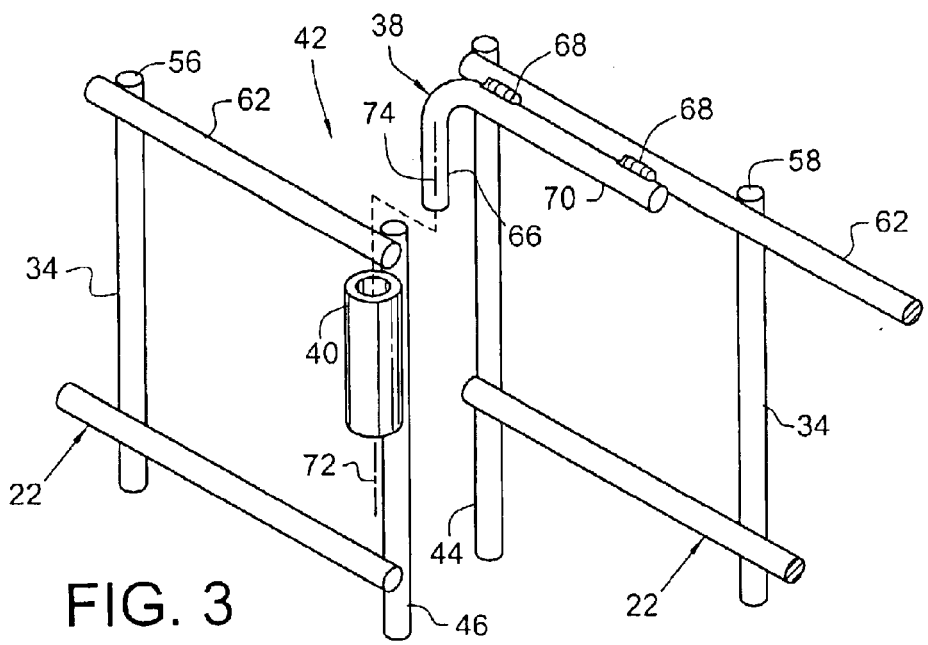
FIG. 3 is a perspective view, partially in section, of the unassembled connection system of the modular-grid fence system according to a preferred embodiment of the present invention.

FIG. 3 is a perspective view, partially in section, of the unassembled integral connection system 42 of the modular-grid fence system 20 according to a preferred embodiment of the present invention.

Figure 4:
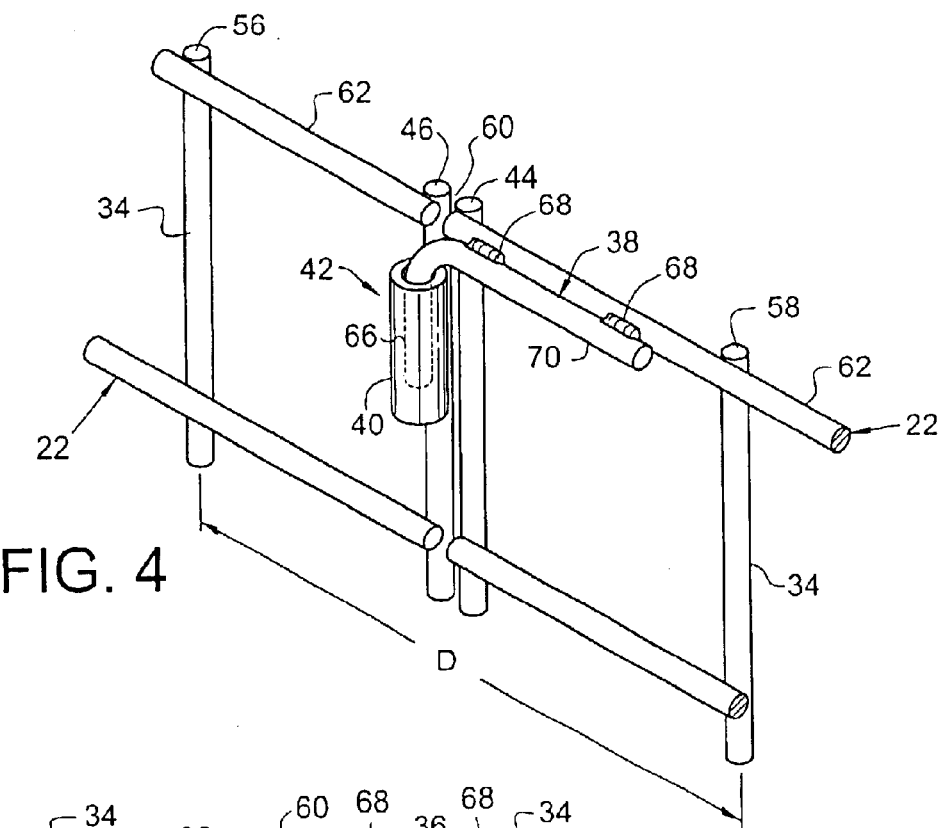
FIG. 4 is a perspective view, partially in section, of the assembled connection system of the modular-grid fence system according to a preferred embodiment of the present invention.

FIG. 4 is a perspective view, partially in section, of the assembled integral connection system 42 of the modular-grid fence system 20 according to a preferred embodiment of the present invention.

Figure 5:
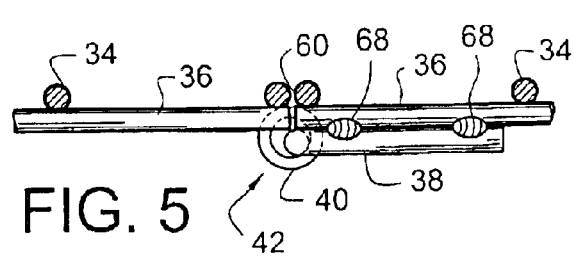
FIG. 5 is a top view, partially in section, of the assembled connection system of FIG. 4.

FIG. 5 is a top view, partially in section, of the assembled integral connection system 42 of FIG. 4. FIG. 3 and FIG. 4 further illustrate a preferred method of connecting the fence panel(s) 22.

Preferably, in order to connect the fence panel(s) 22 together, each respective fence panel 22 preferably comprises an integral connection system 42, as shown. Such integral connection system 42 preferably comprises at least one, but, preferably, two, male connector(s) 38, and at least one, but, preferably, two, female connectors 40. Preferably, each respective modular-grid fence panel 22 may be connected to each other fence panel 22 by inserting each one of male connector(s) 38 into a respective one of the female connectors 40. Under appropriate circumstances, other connecting arrangements integral with fence panel(s) 22 may suffice. The above-described arrangement embodies herein at least two of such plurality of respective such substantially-rectangular, integral, modular-grid fence elements may be connected to each other by inserting each one of such at least two male connectors into a respective one of such at least two female connectors; and, embodies herein wherein each respective such modular-grid element comprises at least one connector structured and arranged to connect at least one of such first length end and such second length end with at least one length end of another of such plurality of modular-grid elements.

Preferably, two male connector(s) 38, preferably L-shaped cylindrical steel wire (embodying herein such at least one male connector comprises at least one cylindrical pin), preferably 7-gauge (three-sixteenths inch in diameter), are connected, preferably by welding, to first end 44 of the fence panel 22, as shown (embodying herein at least two such male connectors are connected to such first length end). Preferably, one male connector 38 is welded to top horizontal wire member 62, as shown. A second male connector 38 is preferably located near the bottom on horizontal wire 64 (as shown in FIG. 2). Preferably, the length of the vertical leg 66 of male connector 38 is about one inch with the horizontal leg 70 having sufficient length to support a pair of welds 68, as shown. Preferably, two female connectors 40, preferably hollow steel tubing (embodying herein such at least one female connector comprises at least one hollow cylinder), preferably each having an outer diameter of about seven-sixteenth inch and an inner diameter of about five-sixteenths inch and each having a length of about one-inch are preferably connected, by welding, to second end 46 (opposite the panel end supporting male connector(s) 38) of the fence panel 22, as shown (embodying herein at least two such female connectors are connected to such second length end). Preferably, the connector(s) 38 and 40 are arranged to adjoin a plurality of fence panels 22, as shown (this arrangement embodying herein wherein each respective such substantially-rectangular, integral, modular-grid fence element comprises at least one connector structured and arranged to connect at least one of such first length end and such second length end with at least one length end of another of such plurality of substantially-rectangular, integral, modular-grid fence elements; and, embodying herein at least two of such plurality of respective such substantially-rectangular, integral, modular-grid fence elements may be connected to each other by inserting each one of such at least two male connectors into a respective one of such at least two female connectors). Most preferably the connector(s) 38 and 40 are arranged such that when the fence panel(s) 22 are adjoined, as shown in FIG. 3 and FIG. 4, the typical modular spacing between vertical wire member(s) 34 is maintained across the two adjoined fence panel(s) 22, and there is little or no gap 60 between each respective fence panel 22 (embodying herein wherein such at least one connector further comprises at least one male connector and at least one female connector structured and arranged such that, when such substantially-rectangular, integral modular grid fence element and such another substantially-rectangular, integral modular grid fence element are connected, there is no substantial gap between such respective elements). For example, if the fence panel(s) 22 is/are about 48 inches long and two panels are adjoined, the overall length of the two adjoined panels will be about 96 inches (if arranged and measured in a straight line). To maintain the vertical wire member 34 center-to-center spacing across two adjoined panels, the longitudinal centerline 72 of the female connectors 40 is approximately justified with the outer edge of second end 46, as shown. Similarly, the longitudinal centerline 74 of vertical leg 66 is approximately justified with the outer edge of first end 44, as shown. When the male connectors 38 and the female connectors 40 are engaged, the distance D (see FIG. 4 and FIG. 5) of about five-inch spacing, center-to-center of the vertical wire member(s) 34, is maintained, when two fence panel(s) 22 are connected end-to-end, as shown (embodying herein wherein such grid pattern and distances are maintained when each such substantially-rectangular, integral, modular wire grid is connected to each other respective such substantially-rectangular, integral, modular wire grid). Under appropriate circumstances, other arrangements to maintain a consistency of grid member spacing may suffice.

Further, the preferred connector(s) 38 and 40 allow the fence panel(s) 22 to swivel about the adjoined panel ends from a face-to-face panel position, comprising a panel-to-panel angle of about zero degrees (useful for transporting), to an acute angle position (useful with angular fence portions), to an in-line position comprising a panel-to-panel angle of about one-hundred-eighty degrees (for in-line fencing portion).

Figure 6:
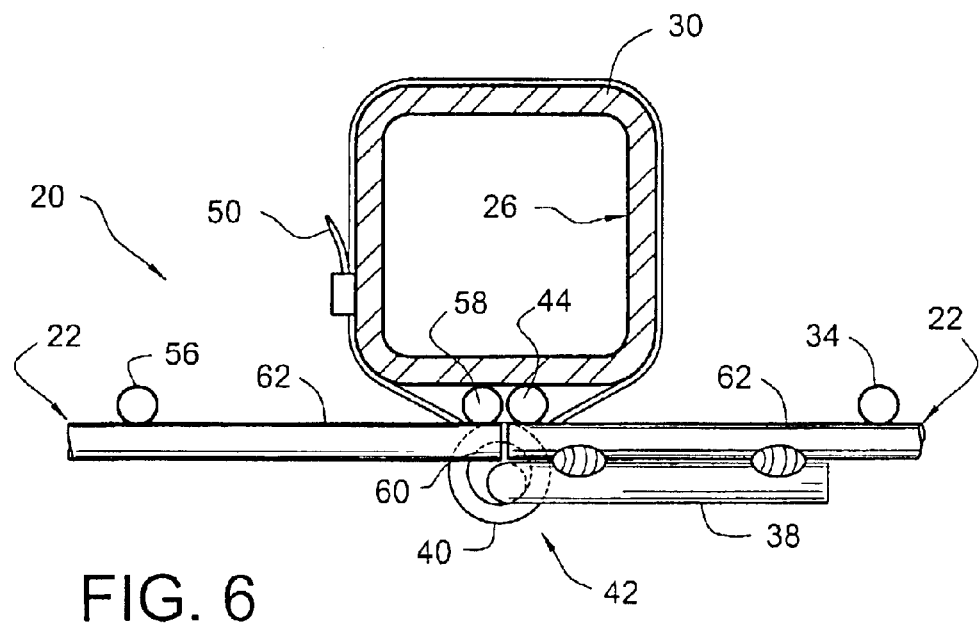
FIG. 6 is a top view, partially in section, of an embodiment of the modular-grid fence system attached to a post member of a primary fence according to a preferred embodiment of the present invention.

FIG. 6 is a top view, partially in section, of an embodiment of an attachment of the modular-grid fence system 20 to a post member 30 of a primary fence 26 according to a preferred embodiment of the present invention. Preferably, the fence panel(s) 22 are attached to the fence post members 30, preferably, utilizing a plastic tie 50, such as is commonly used to tie electrical cable wires together (for example, such as those available from TIEWRAPS.com™) The preferred modularity of fence system 20 permits the integral connection system 42 and gap 60 to preferably coincide with the vertical post members 30 of primary fence 26, as shown, thereby providing a secure and attractive installation. Under appropriate circumstances, other arrangements may suffice.

In a preferred method of installation, with reference to FIG. 1 through FIG. 6, a plurality of fence panel(s) 22 are joined end-to-end using integral connection system 42, as shown (embodying herein wherein each respective such modular-grid fence element comprises at least one connector structured and arranged to connect at least one of such first length end and such second length end with at least one length end of another of such plurality of modular-grid fence elements). Preferably, the arrangement of connected fence panel(s) 22 are raised and positioned over primary fence 26 with the first end 44 and second end 46 of fence panel(s) 22 aligned with vertical bars 28 of primary fence 26, as shown. Preferably, fence panel(s) 22 are then secured to primary fence 26 using plastic tie 50 (embodying herein at least one attacher structured and arranged to attach such plurality of grid fence elements to the primary fencing passing around first end 44 and second end 46 and post member 30, as shown.

This arrangement embodies herein providing a plurality of modular-grid fence elements, each respective such modular grid fence element having a first length end and a second length end, wherein each respective such modular-grid fence element comprises at least one connector structured and arranged to connect at least one of such first length end and such second length end with at least one length end of another of such plurality of modular-grid fence elements; using such at least one connector, connecting such plurality of modular-grid fence elements; attaching such plurality of modular-grid fence elements to the primary fence system.

The preferred swivel feature of integral connection system 42 permits fence system 20 to adapt to exterior and interior corners 76 of primary fence 26, as shown.

Figure 7:
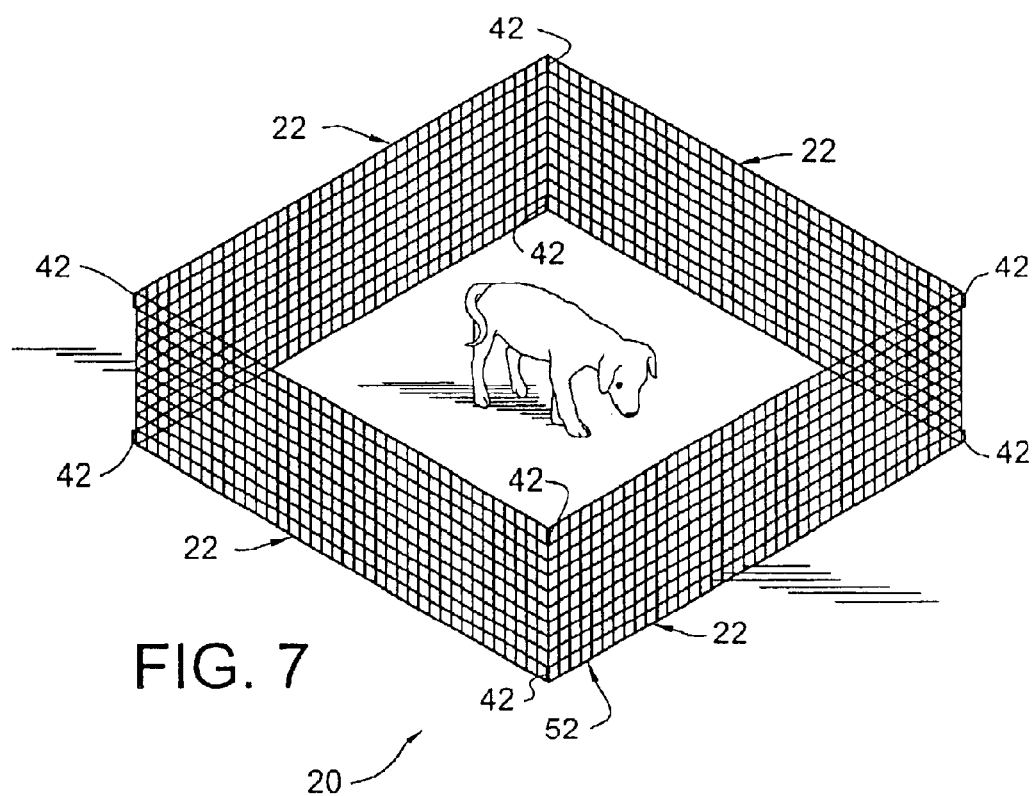
FIG. 7 is a perspective view of the modular-grid fence system in use as a freestanding unit according to a preferred embodiment of the present invention.

FIG. 7 is a perspective view of the modular-grid fence system 20 in use as a freestanding unit 52 according to a preferred embodiment of the present invention. Preferably, utilizing the above described integral connection system 42, the fence panel(s) 22 may be arranged into a freestanding unit 52, as shown (embodying herein wherein such plurality of such substantially-rectangular, integral, modular grid fence elements may be connected to each other respective such plurality of substantially-rectangular, integral, modular grid fence elements to form a self-standing fence). Under appropriate circumstances, other arrangements may suffice.

Further, the above described fence system 20 may be easily disassembled and reassembled quickly and without tools. Preferably, the fence panel(s) 22 are easily stacked and utilize a minimal amount of shipping space. In addition, the fence panel(s) 22 are shippable in a flat container. Further, the fence system 20 may be shipped in a kit, ready for assembly and installation to an existing fence, or as a freestanding unit. Under appropriate circumstances, the fence system may also be made in different sizes and modules to complement a user's needs.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from each and every novel detail, feature, article, process, system and/or method disclosed in or mentioned by or shown in this specification, including the drawings, the claims, the abstract, and any appendices.

What is claimed is:

1. A secondary fence system, related to attachment to at least one permanent primary fence, such primary fence comprising, at least one substantially planar fence section comprising apertures situated between at least two substantially vertical supports, said system comprising, in combination:
 a) at least two rigid, substantially rectangular modular grid fence elements attached substantially parallel and adjacent to such at least one permanent primary fence,
 b) wherein each respective said substantially rectangular modular grid fence element comprises
  i) at least one first length end,
  ii) at least one second length end, and
  iii) at least one connector connecting said at least one first length end to said at least one second length end;
 c) wherein said at least two substantially vertical supports of said primary fence define a predetermined distance therebetween and said predetermined distance substantially equals the total length of an integer number of said substantially rectangular planar modular grid fence elements;

d) wherein said substantially rectangular planar modular grid fence elements comprise substantially rectangular apertures;

e) wherein said substantially rectangular apertures are substantially smaller than the apertures of the primary fence section.

2. The secondary fence system according to claim 1 wherein said at least one connector further comprises at least one male connecter and at least one female connector structured and arranged such that, when said at least two substantially rectangular modular grid fence elements are connected, there is no substantial gap between said respective elements.

3. The secondary fence system according to claim 2 wherein:

a) said at least one male connector comprises at least one cylindrical pin; and, b) said at least one female connector comprises at least one hollow cylinder;

c) wherein said at least one male connector slidably inserts into said at least one female connector.

4. The secondary fence system according to claim 1 wherein said at least two substantially rectangular modular grid fence elements each comprises a substantially-rectangular, modular wire grid, each said substantially-rectangular, modular wire grid having a plurality of vertical wires and a plurality of horizontal wires connected together in a grid pattern.

5. The secondary fence system according to claim 4 wherein:

a) each said substantially-rectangular, modular wire grid comprises a first length end and a second length end;

b) at least two said male connectors are connected to said first length end;

c) at least two said female connectors are connected to said second length end; and d) said at least two substantially rectangular modular grid fence elements may be connected to each other by inserting each one of said at least two male connectors into a respective one of said at least two female connectors.

6. The secondary fence system according to claim 5 wherein:

a) each said at least two male connectors comprises a cylindrical pin;

b) each said at least two female connectors comprises a hollow cylinder;

c) said grid pattern comprises vertical and horizontal wires spaced about every 2½ inches, on center, in both directions;

d) each said substantially-rectangular, modular wire grid comprises an exterior dimension of about twenty-two and one-half inches by about forty-seven and one-half inches;

e) each said substantially-rectangular, modular wire grid may be connected to each other respective said substantially-rectangular, modular wire grid; and f) said grid pattern and distances are maintained when each said substantially-rectangular, modular wire grid is connected to each other respective said substantially-rectangular, modular wire grid.

7. The secondary fence system according to claim 6 wherein each said at least two substantially rectangular modular grid fence elements comprises non-corrosive paint.

8. The secondary system according to claim 6 wherein each said at least two substantially rectangular modular grid fence elements comprises non-corrosive material.

9. The secondary fence system according to claim 4 wherein said grid pattern comprises vertical and horizontal wires spaced about every 2½ inches, on center, in both directions.

10. The secondary fence system according to claim 9 wherein said grid pattern and distances are maintained when said at least one connector is used to connect one of said substantially-rectangular, modular wire grid to another of said substantially-rectangular, modular wire grid.

11. The secondary fence system according to claim 1 wherein said substantially-rectangular, modular wire grid comprises an exterior dimension of about two feet by about four feet.

12. The secondary fence system according to claim 1 wherein each of said at least two substantially rectangular modular grid fence elements comprises steel.

13. The secondary fence system according to claim 1 wherein each said plurality of substantially-rectangular, integral, modular-grid fence elements comprises paint.

14. The secondary fence system according to claim 1 wherein each said at least two substantially rectangular modular grid fence elements comprises non-corrosive paint.

15. The secondary fence system according to claim 1 wherein each said at least two substantially rectangular modular grid fence elements comprises non-corrosive material.

16. The modular fence system according to claim 1 wherein said substantially rectangular planar modular grid fence elements are substantially shorter than the at least one permanent primary fence.

17. The modular fence system according to claim 1 wherein:

a) the primary permanent fence comprises no more than three horizontal members; and b) said substantially rectangular modular grid fence elements comprise at least five horizontal members.

18. The modular fence system according to claim 1 wherein each said at least two substantially rectangular modular grid fence elements further comprises:

a) substantially horizontal members having a first cross-sectional area;

b) substantially vertical members, having a second cross-sectional area; and c) wherein said first cross-sectional area and said second cross-sectional area are substantially equal.

19. A method of making a secondary fence system attached to a primary fence system, comprising, in combination:

a) providing a plurality of rigid modular-grid fence elements, each respective said modular grid fence element having a first length end and a second length end, wherein each respective said modular-grid fence element comprises at least one connector structured and arranged to connect at least one of said first length end and said second length end with at least one length end of another of said plurality of modular-grid fence elements;

b) using said at least one connector, connecting said plurality of modular-grid fence elements;

c) attaching said at least two of plurality of modular-grid fence elements to the primary fence system such that each modular grid fence element is attached parallel and directly abuts the primary fence system.

20. A method for use relating to a secondary fence system, attachable to at least one permanent primary fence, such primary fence comprising, at least one substantially planar fence section comprising apertures situated between at least two substantially vertical supports, said method comprising the steps of:

a) providing at least one rigid substantially rectangular planar modular grid fence element comprising at least one substantially rectangular aperture wherein such at least one substantially rectangular aperture is substantially smaller than the apertures of the primary fence section;

b) arranging an integer number of such substantially rectangular planar modular grid fence elements to substantially fit evenly between such at least two substantially vertical supports of the at least one permanent primary fence; and c) arranging an integer number of such substantially rectangular planar modular grid fence elements between such at least two substantially vertical supports of the at least one permanent primary fence, wherein said at least two substantially vertical supports of said primary fence define a predetermined distance therebetween and said predetermined distance substantially equals the total length of the integer number of said substantially rectangular planar modular grid fence elements; and In the second to last line, changed "adjacent to" to—directly abutting.

* * * * *